(12) United States Patent
Kim et al.

(10) Patent No.: US 8,949,904 B2
(45) Date of Patent: Feb. 3, 2015

(54) CHANNEL CONTROL METHOD AND APPARATUS

(75) Inventors: Si Baek Kim, Suwon-si (KR); Jae Young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 12/890,981

(22) Filed: Sep. 27, 2010

(65) Prior Publication Data

US 2011/0078743 A1    Mar. 31, 2011

(30) Foreign Application Priority Data

Sep. 28, 2009    (KR) .................... 10-2009-0091695

(51) Int. Cl.
```
G06F 3/00         (2006.01)
G06F 13/00        (2006.01)
H04N 5/445        (2011.01)
H04N 7/173        (2011.01)
H04N 5/50         (2006.01)
H04N 21/222       (2011.01)
H04N 21/431       (2011.01)
H04N 21/434       (2011.01)
H04N 21/4402      (2011.01)
H04N 21/482       (2011.01)
```

(52) U.S. Cl.
CPC ............. *H04N 5/50* (2013.01); *H04N 5/44543* (2013.01); *H04N 21/2221* (2013.01); *H04N 21/4316* (2013.01); *H04N 21/4347* (2013.01); *H04N 21/440263* (2013.01); *H04N 21/482* (2013.01)
USPC ................. 725/56; 725/43; 725/50; 725/133

(58) Field of Classification Search
CPC ................................................. H04N 21/42208
USPC ................................................................ 725/56
See application file for complete search history.

(56) References Cited

U.S. PATENT DOCUMENTS

| | | | |
|---|---|---|---|
| 5,031,046 A * | 7/1991 | Bruggemann | 348/734 |
| 6,862,741 B1 * | 3/2005 | Grooters | 725/39 |
| 2003/0151621 A1 * | 8/2003 | McEvilly et al. | 345/744 |
| 2005/0108751 A1 * | 5/2005 | Dacosta | 725/39 |
| 2006/0101338 A1 * | 5/2006 | Kates | 715/716 |
| 2007/0011702 A1 * | 1/2007 | Vaysman | 725/45 |
| 2007/0074248 A1 * | 3/2007 | Kim | 725/38 |
| 2007/0204302 A1 * | 8/2007 | Calzone | 725/46 |
| 2007/0234388 A1 * | 10/2007 | King | 725/39 |
| 2008/0034397 A1 * | 2/2008 | Schultz et al. | 725/139 |
| 2008/0117335 A1 * | 5/2008 | Yi | 348/731 |
| 2008/0270890 A1 * | 10/2008 | Stern | 715/239 |
| 2010/0251315 A1 * | 9/2010 | Ohmae | 725/110 |
| 2011/0167447 A1 * | 7/2011 | Wong | 725/40 |

* cited by examiner

*Primary Examiner* — Nathan Flynn
*Assistant Examiner* — William J Kim
(74) *Attorney, Agent, or Firm* — Jefferson IP Law, LLP

(57) ABSTRACT

A channel control method and apparatus of a broadcast reception system are provided for facilitating channel selection by providing multiple broadcast channel images on a screen. A method of managing channels for a channel control device includes receiving video images of plural channels from a content delivery device, displaying the video images of plural channels on a screen simultaneously, receiving an input for selecting at least one of the plural channels; and transmitting a channel selection request indicating the selected channel to the content delivery device. The channel control method and apparatus are capable of facilitating a user to search for broadcast channels, resulting in improvement of the user's convenience.

18 Claims, 6 Drawing Sheets

CHANNEL CONTROL METHOD AND APPARATUS

PRIORITY

This application claims the benefit under 35 U.S.C. §119 (a) of a Korean patent application filed on Sep. 28, 2009 in the Korean Intellectual Property Office and assigned Serial No. 10-2009-0091695, the entire disclosure of which is hereby incorporated by reference.

BACKGROUND OF THE INVENTION

1. Field of the Invention

The present invention relates to a broadcast receiver. More particularly, the present inventions relates to a channel control method and apparatus of a broadcast reception system for facilitating channel selection by providing multiple broadcast channel images on a screen.

2. Description of the Related Art

Typically, television channel switching is made by means of a remote controller. The remote controller is a device for controlling an electronic apparatus and, recently, the remote control functionality may be integrated within a cellular phone or a cordless home phone. In the conventional remote controller, channel switching can be done in two ways: first, inputting a channel number by pressing numeral buttons directly, and second, navigating channels sequentially by pressing up/down (navigation) buttons. The reason why the remote control functionality can be readily integrated into a cellular phone or a cordless home phone is that these devices are equipped with numeral buttons, volume buttons, and navigation buttons that can be respectively used for direct channel selection, volume adjustment, and channel navigation.

Meanwhile, as the various broadcast services such as cable Television (TV), satellite TV, and Internet Protocol (IP) TV are popularized, a number of available broadcast channels may be increased up to more than 100 channels. If the number of a target channel is not known, the user might need to navigate all of the more than 100 channels in a worst case.

Because the channel zapping delay of a digital broadcast receiver is longer than that of an analog broadcast receiver and it can be difficult for the user to remember all of the channel numbers of content providers, the channel searching time for selecting the target channel is likely to increase as the number of channels increases, resulting in the user's inconvenience.

Therefore, a need exists for a channel control method and apparatus of a broadcast reception system for facilitating channel selection by providing multiple broadcast channel images on a screen.

SUMMARY OF THE INVENTION

An aspect of the present invention is to address at least the above-mentioned problems and/or disadvantages and to provide at least the advantages described below. Accordingly, an aspect of the present invention is to provide a channel control method and apparatus for a broadcast receiver that is capable of facilitating selection of a target broadcast channel.

In accordance with an aspect of the present invention, a method for managing channels of a channel control device is provided. The method includes receiving video images of plural channels from a content delivery device, displaying the video images of plural channels on a screen simultaneously, receiving an input for selecting at least one of the plural channels, and transmitting a channel selection request indicating the selected channel to the content delivery device.

In accordance with another aspect of the present invention, a channel control device is provided. The device includes a display unit which displays a multichannel screen image including video images of multiple channels, an input unit which receives a channel selection input for selecting at least one of the video images corresponding to the multiple channels, a channel selection request transmitter which transmits a channel selection request to a channel configuration device, and a control unit which controls the display unit to display the multiple video images on a single screen and the channel selection request transmitter to transmit the channel selection request corresponding to the channel selection input to the channel configuration device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
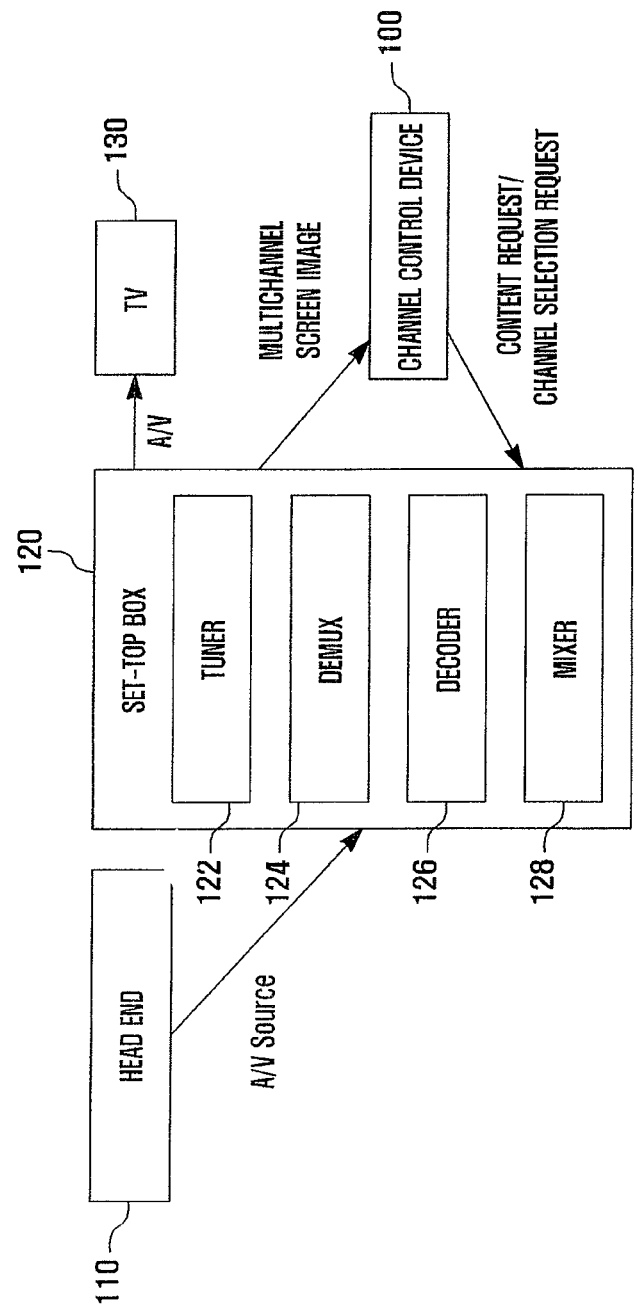
FIG. 1 is a diagram illustrating a configuration of a broadcast reception system according to an exemplary embodiment of the present invention.

FIG. 1 is a diagram illustrating a configuration of a broadcast reception system according to an exemplary embodiment of the present invention.

Referring to FIG. 1, the broadcast reception system includes a channel control device 100, a head end 110, a set-top box 120, and a TV 130.

The head end 110 is a device which converts received radio signals carrying broadcast data to intermediate frequency signals, adjusts voice level of signals, reconverts the signals into the microwave signals, mixes the signals, and transmits the mixed signal through a relay transmission network. The head end 110 transfers the audio/video (A/V) source data to the set-top box 120.

Here, the term "set-top box" is used to describe a home communication terminal (so called, interactive television) required for the next generation bidirectional multimedia communication services such as Video On Demand (VOD) and network games. The term "set-top box" derives from the meaning of "the box placed on a television set," and may also be referred to as a "subscriber signal conversion device." The set-top box is connected to a bidirectional television service or video transmission service network of a telephone company (e.g., a video dial tone provided by a local telephone company in the U.S.A.) so as to provide the broadcast data to the home television display. The set-top box is capable of receiving and converting video signals as well as communicating with the video server located at a telephone company or Cable Television (CATV) station. The set-top box can be configured to include various features such as telephony interface and/or Persona Computer (PC) connection interface. In order to take advantage of the interactive television market, communication, computer, and electronic appliance manufacturers develop various competitive set-top boxes.

In an exemplary embodiment of the present invention, the set-top box 120 includes a tuner 122, a demultiplexer (demux) 124, a decoder 126, and a mixer 128.

The tuner 122 is a device for selecting and receiving signals on an intended frequency in a radio receiver, a television, or a set-top box.

The demux 124 is a logical circuit performing the opposite of the function of a multiplexer. Because a demux connects the input to one of multiple outputs selectively, it is also called as a splitter.

A 1/n demultiplexer has one input and 2n outputs and n selection lines for selecting one of the 2n outputs.

The decoder 126 is a device to retrieve the original information from an encoded digital signal.

The mixer 128 is a device for combining/splitting different frequency band signals onto a cable as in a VHF/UHF (V/U) combiner for home TV.

Since the configuration of the set-top box 120 is well known in the related art, a detailed description thereof is omitted herein.

In the following description, the term "video content" has to be understood as visual data including both the motion and still pictures received on an intended channel.

In the following description, the term "content delivery device" is used to denote a device, such as the set-top box 120, for transferring received contents to the TV and other display devices.

In the following description, the term "channel configuration device" is used to denote a device for configuring the channel of a broadcast receiver such as TV (e.g., the set-top box 120 can incorporate the channel configuration device). The channel configuration device can be integrated into the TV 130 in an exemplary embodiment of the present invention.

Figure 2:
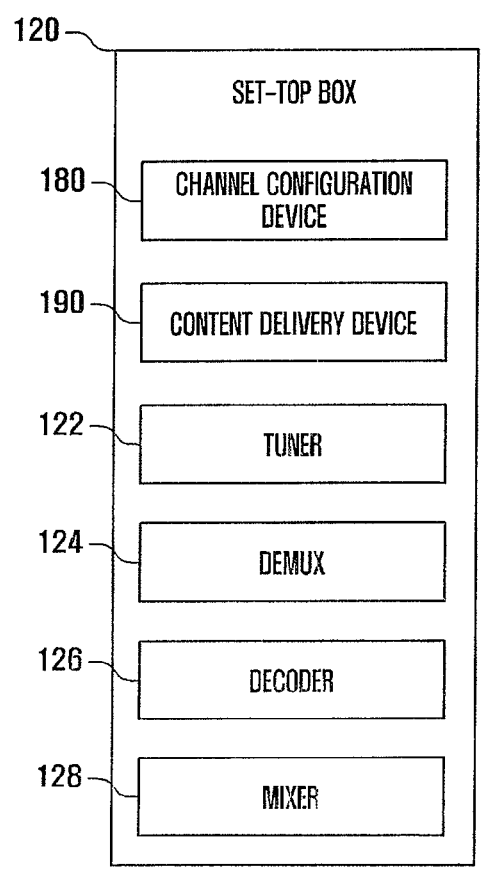
FIG. 2 is a block diagram illustrating a configuration of a set-top box of a channel reception system according to an exemplary embodiment of the present invention.

FIG. 2 is a block diagram illustrating a configuration of a set-top box of a channel reception system according to an exemplary embodiment of the present invention.

Referring to FIG. 2, the set-top box 120 according an exemplary embodiment of the present invention includes a channel configuration device 180, a content delivery device 190, a tuner 122, a demux 124, a decoder 126, and a mixer 128.

In the exemplary embodiment of FIG. 2, the set-top box 120 can include both the channel configuration device 180 and the content delivery device 190. In other exemplary embodiments, the channel configuration device 180 and content delivery device 190 can be integrated with other devices of the channel reception system, e.g., the channel configuration device 180 can be integrated into the TV 130.

Because the operations of the tuner 122, demux 124, decoder 126, and mixer 128 have been described with reference to FIG. 1, detailed descriptions thereof are not repeated here.

In the following description, it is assumed, unless state otherwise, that the set-top box 120 includes the channel configuration device 180 and the content delivery device 190.

In the following description, the term "content request message" denotes a message transmitted by the channel control device 100 requesting the content delivery device 190 to supply video contents of multiple channels.

In the following description, the term "channel selection request message" denotes a message transmitted by the channel configuration device 180 requesting the TV 130 to configure the target channel.

According to an exemplary embodiment of the present invention, the set-top box 120 receives the content request message transmitted by the manager 100 and supplies the video contents of multiple channels to the channel control device 100 in response to the content request message. Also, the set-top box 120 receives the channel selection request message transmitted by the channel control device 100 and supplies the audio/video data of the channel indicated by the channel request message to the TV 130.

The TV 130 receives the audio/video data supplied by the set-top box 120 and outputs the audio/video data.

The channel control device 100 works as a remote controller.

The channel control device 100 can be implemented as a dedicated channel management device or a multifunctional device incorporating functionality of a portable device having a display such as mobile phone, Portable Multimedia Player (PMP), information terminal, Smartphone, and Mobile Internet Device (MID). In case that the channel control device 100 is incorporated into a portable device having a display, it is advantageous for the user to use the portable device as a remote controller.

Although the description is directed to the case where the channel control method is performed in association with the TV, the present invention is not limited thereto but can also be applied to other types of display devices that can display video data.

In an exemplary embodiment of the present invention, the channel control device 100 starts channel search function in response to a channel search command input by the user. The channel control device 100 first sends the set-top box 120 a content request message to request the video data of multiple channels. Upon receipt of the content request message, the set-top box supplies the video data of multiple channels to the channel control device 100. The channel control device 100 displays the video data of multiple channels in respective channel windows on its own display. If the user selects one of the channel windows, the channel control device 100 sends the set-top box 120 a channel selection request message indicating the channel corresponding to the selected channel window.

Descriptions are made of the configurations and operations of the channel control device 100 and the set-top box 120 in more detail with reference to FIGS. 3 to 6.

Figure 3:
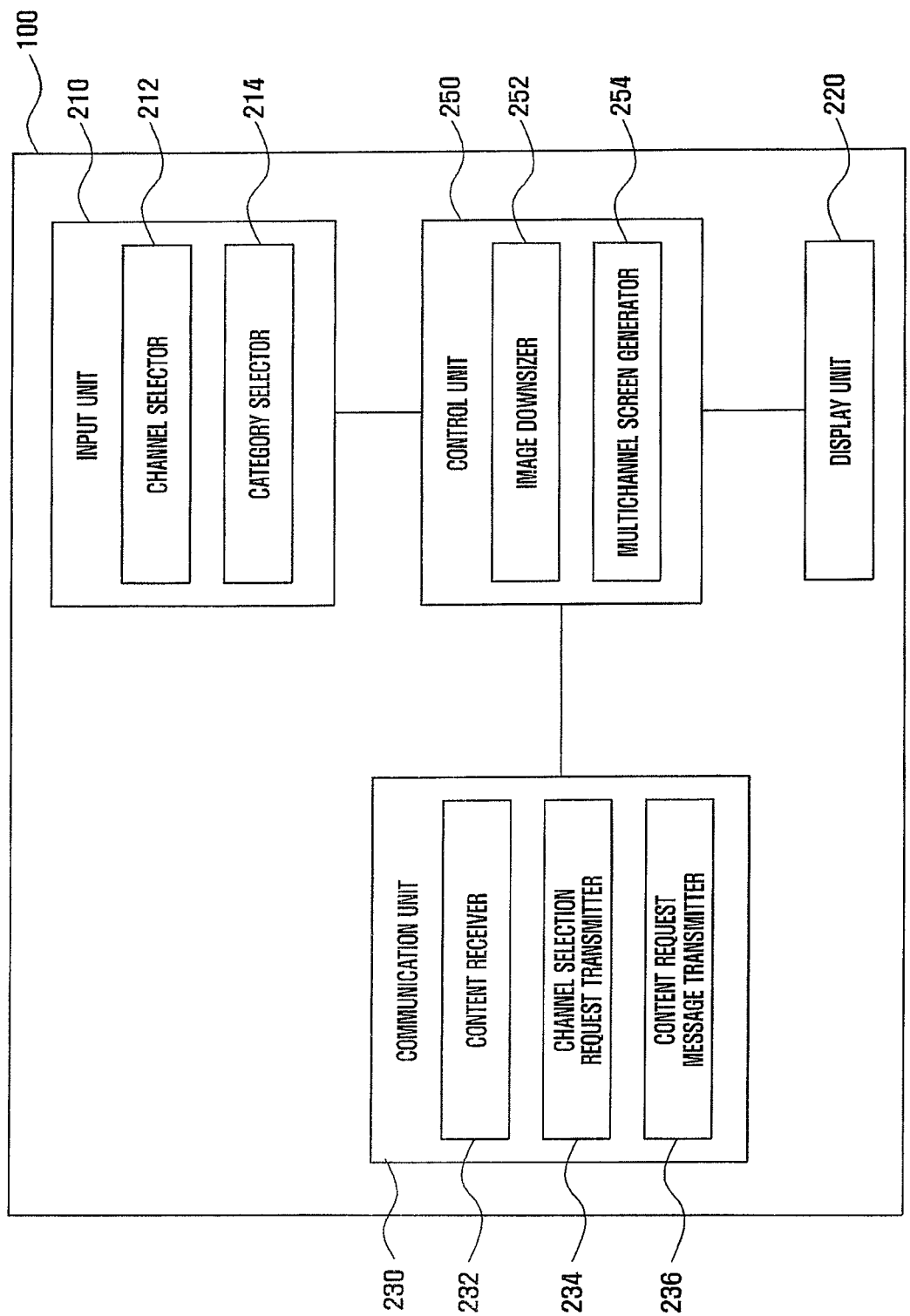
FIG. 3 is a block diagram illustrating a configuration of a channel control device of a broadcast reception system according to an exemplary embodiment of the present invention.

FIG. 3 is a block diagram illustrating a configuration of a channel control device of the broadcast reception system according to an exemplary embodiment of the present invention.

Referring to FIG. 3, the channel control device 100 includes an input unit 210, a control unit 250, a communication unit 230, and a display unit 220.

The input unit 210 is implemented with at least one of a touchscreen and a touchpad, and converts a user input into an electrical signal which is transmitted to the control unit 250.

In an exemplary embodiment of the present invention, the input unit 210 includes a channel selector 212 and a category selector 214.

The channel selector 212 is responsible for receiving a user input made by selecting one of the channel windows displayed on the display unit 220. The channel window can be selected by a touch made on the touchscreen or a key of the keypad. The channel selection input is converted into an electric signal, which is transferred to the control unit 250. The control unit 250 controls a channel selection request transmitter 234 of the communication unit 230 to transmit the channel selection request message to the channel configuration device such as set-top box 120.

The category selector 214 receives a user input for selecting a category. The category selection input is made to display channels grouped into a selected category. For example, if a sports category is selected, the channel windows presenting the video data of the channels classified into the sports category are displayed on the display unit 220. The channels can be categorized by the user, set-top box manufacturer, or software provider.

Of course, the channel control method can be implemented without the category selection concept according to other exemplary embodiments. In this case, the category selector 214 is omitted.

The communication unit 230 is responsible of the communication with other external devices and includes a content receiver 232, a channel selection request transmitter 234, and a content request message transmitter 236.

The content request message transmitter 236 transmits a content transmission request message to the content delivery device 190 (i.e. set-top box 120). If the content request message is received, the set-top box 120 transmits the video data of the multiple channels to the channel control device 100.

In an exemplary embodiment of the present invention, the content delivery device 190 can be configured to transfer the video data of multiple channels to the channel control device 100 periodically, or in response to the fulfillment of a predetermined condition.

The content receiver 232 receives the video data of the multiple channels that are transmitted by the content delivery device 190 (e.g. set-top box 120). The video data of the multiple channels are displayed on the display unit 220 under the control of the control unit 250.

The channel selection request transmitter 234 sends a channel selection request to the channel configuration device 180 under the control of the control unit 250. The channel selection request is generated in response to the user command input by means of the channel selector 212 of the input unit 210.

The display unit 220 displays the video data of the multiple channels simultaneously in the form of channel windows presenting the respective corresponding video data.

The video data of the multiple channels are video contents received by the content receiver 232 of the communication unit 230.

The control unit 250 controls the operations of the input unit 210, the communication unit 230, and the display unit 220.

The control unit 250 controls the display unit 220 to display the video data received by the content receiver 232 on the multiple channels simultaneously.

The control unit 250 also controls the channel selection request transmitter 234 to send the channel selection request corresponding to the channel selection input by means of the channel selector 212 to the channel configuration device 180.

The control unit 250 also controls the content request message transmitter 236 to send the content request message for video data of multiple channels to the content delivery device 190.

In an exemplary embodiment in which the channels to be displayed simultaneously are determined according to a selected channel category, the control unit 250 can control the display unit 220 to simultaneously display the video data of the channels classified into the category indicated by the category selection command input by means of the category selector 214. A description is made of the case where the category selection command is input later with reference to FIGS. 4 to 6.

In the following description, the term "multichannel content" is used to denote a group of channel windows presenting the video data of the multiple channels in reduced size.

The control unit 250 can include an image downsizer 252 and a multichannel screen generator 254.

The image downsizer 252 reduces in size the images corresponding to the video data of the multiple channels. The images can be resized at a predetermined reduction rate, or by means of cropping.

The multichannel screen generator 254 arranges the image reduced in size to generate a combined multichannel screen image.

In the exemplary embodiment of FIG. 3, the multichannel screen image is generated by the control unit 250 of the channel control device 100. Since the channel control device 100 is compact in size, it may not be appropriate to configure the channel control device 100 to perform the complex video data processing necessary to generate the multichannel screen image. For this reason, the multichannel screen image generation can be performed by the content delivery device 190, e.g., the set-top box 120. The multichannel screen image generation process of the content delivery device is described later in detail with reference to FIGS. 4 and 5.

According to an exemplary embodiment of the present invention, if the channel request message transmitted to a broadcast station (e.g., an IP TV server) is received, the broadcast station generates the multichannel screen image and sends the multichannel screen image to the channel control device via the set-top box 120.

In exemplary embodiments where the multichannel screen image is generated by the content delivery device 190 or by the broadcast station, the control unit 250 can be configured without the image downsizer 252 and the multichannel screen generator 254.

Figure 4:
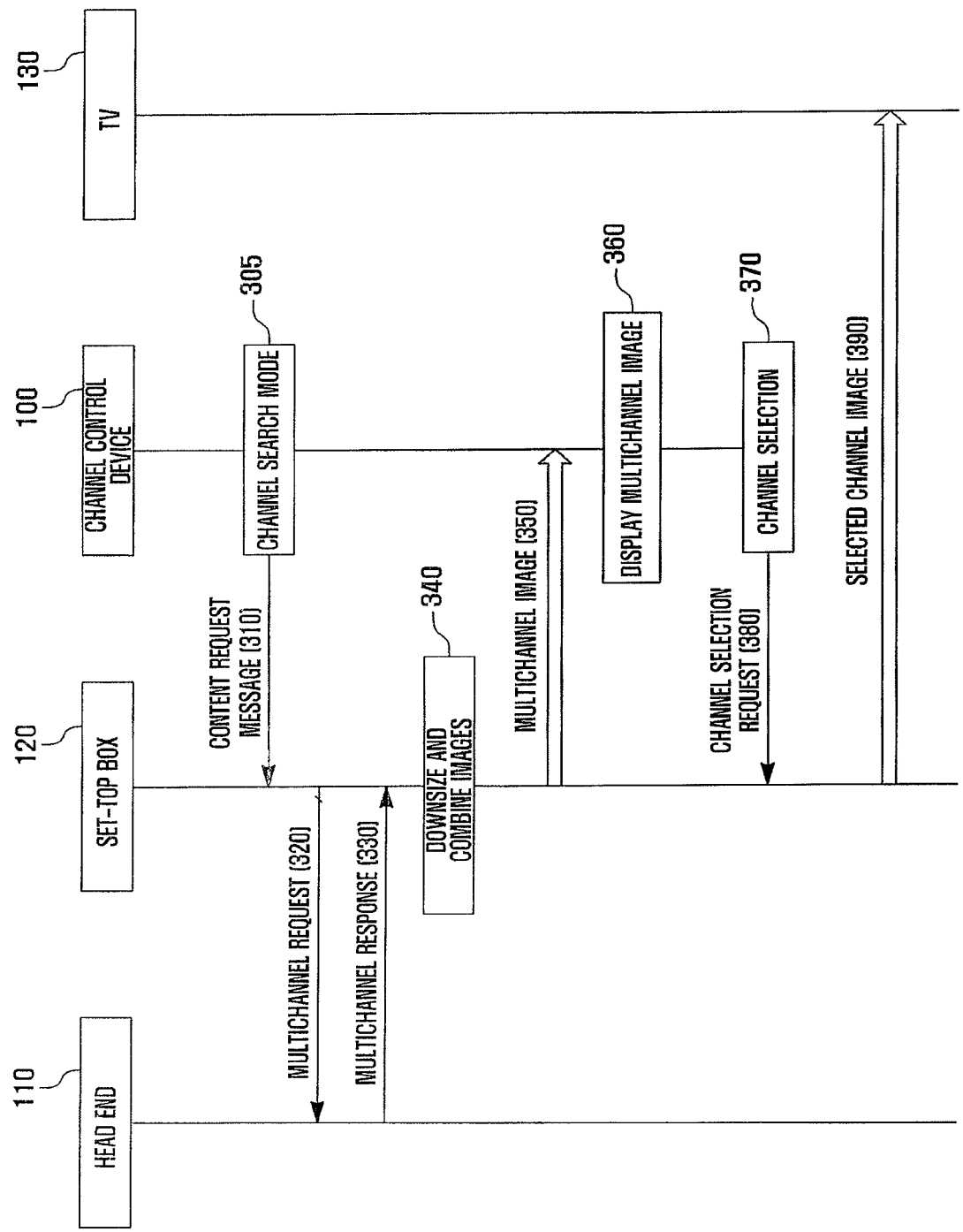
FIG. 4 is a signaling diagram illustrating message flows among a head end, a set-top box, a channel control device, and a TV of a broadcast reception system according to an exemplary embodiment of the present invention.

FIG. 4 is a signaling diagram illustrating message flows among a head end, a set-top box, a channel control device, and a TV of a broadcast reception system according to an exemplary embodiment of the present invention.

Referring to FIG. 4, the channel control device 100 first enters a channel search mode in step 305.

The channel control device 100 enters the channel search mode in response to a channel search command input by the user. In an exemplary embodiment of the present invention, the channel control device 100 can be configured to enter the channel search mode periodically. In an exemplary embodiment of the present invention, the channel control device can be configured to enter the channel search mode when a predetermined conditioned is fulfilled, e.g., when the channel control device 100 is located within a distance of 10 m from the set-top box 120 or from the content delivery device 190.

Upon entering the channel search mode, the content request message transmitter 236 sends a content request message to the set-top box 120 in step 310. Here, the set-top box 120 can be understood as a content delivery device 190.

The content request message can include a list of channels belonging to the same category.

If the content request message is received, the set-top box 120 sends a multichannel request message to the head end 110 in step 320. The multichannel request message is a request for the video data of multiple channels. In the case that the content request message includes the channel list, the multichannel request message also includes the channel list.

Upon receipt of the multichannel request message, the head end 110 sends a multichannel response message to the set-top box in step 330. The multichannel response message can carry the video data of the multiple channels for forming the corresponding multiple screen images.

In case that the multichannel request message has the channel list, the head end 110 transmits the multichannel response containing the video data of the channels listed in the channel list to the set-top box 120.

The channel list carried by the content request message can be configured by the user. The user can add/delete channels to/from, and change the sorting order of, the channel list which is displayed on the display unit 220, by means of a configuration interface of the channel control device 100.

The multichannel response message can contain video data identical with data to be transmitted to the TV 130 for display purposes. However, since the video data carried by the multichannel response message is displayed in the form of reduced-size images, it is preferable to reduce the resolution and video quality so as to be appropriate for the limited bandwidth.

Here, it is assumed that the video data carried by the multichannel response message is identical in content with that to be output by the TV 130, but different in resolution and quality for simplifying the explanation.

The video data displayed on the display unit 220 of the channel control device 100 can be presented in the form of a still image. In this case, the multichannel response message carries the video data of still images.

The multichannel response message is not always transmitted only in response to the multichannel request message. In some exemplary embodiments of the present invention, the head end 110 can be configured to transmit the multichannel response message to the set-top box 120 periodically.

If the multichannel response message is received, the set-top box 120 reduces the screen images corresponding to the video data of the multiple channels in size and combines reduced-size screen images into a multichannel screen image in step 340.

Figure 5:
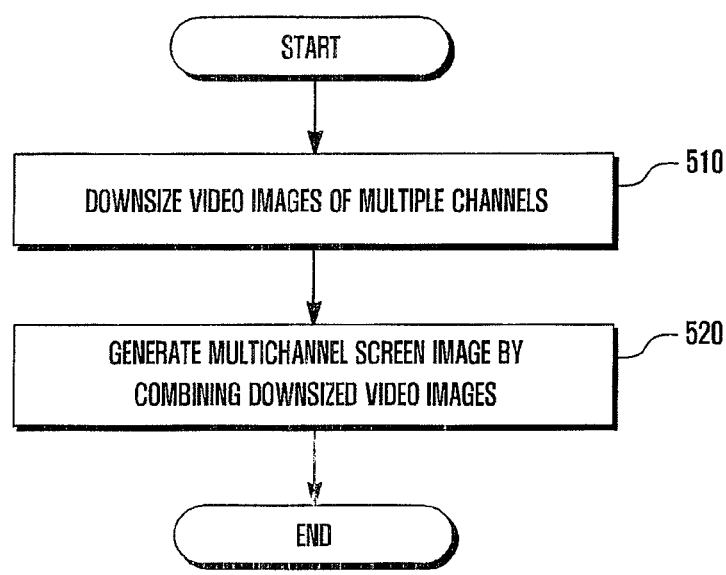
FIG. 5 is a flowchart illustrating steps of screen images size-reduction and combination process according to an exemplary embodiment of the present invention.

FIG. 5 is a flowchart illustrating steps of screen images size-reduction and combination process 340 of FIG. 4.

Referring to FIG. 5, the set-top box 120 processes the video data received from the head end 110 to acquire the screen images of the multiple channels that are reduced in size in step 510.

The image-size reduction can be done by reducing the individual screen images of the multiple channels at a predetermined reduction rate or by cropping the center-areas of individual screen images.

Next, the set-top box 120 arranges and combines the size-reduced screen images in step 520. The image obtained by combining the size-reduced screen images is called a multichannel screen image.

Although the multichannel screen image is generated by the set-top box 120 herein, it can be generated by the control unit 250 of the channel control device 100 as described with reference to FIG. 3. In some exemplary embodiment of the present invention, the set-top box 120 can receive the multichannel screen image generated by the head end 110 in the multichannel response message.

Regardless of whether the multichannel screen image is generated by the set-top box 120 or the head end 110, steps 510 and 520 can be applied with or without modifications.

In any case, the screen images corresponding to the video data of the multiple channels are treated as one multichannel screen image, i.e. transmitted and displayed as one screen image.

Returning to FIG. 4, once the multichannel screen image is generated, the set-top box 120 sends the multichannel screen image to the channel control device 100 in step 350. The content receiver 232 of the channel control device 100 receives the multichannel screen image transmitted by the set-top box 120.

In the case that the multichannel screen image is generated by the control unit 250 of the channel control device 100, the set-top box 120 sends the video data corresponding to the individual channels to the channel control device without performing any process, and the control unit 250 of the channel control device 100 generates the multichannel screen image with the video data.

In the exemplary embodiment of FIG. 4, the set-top box 120 generates the multichannel screen image and sends the multichannel screen image to the channel control device.

If the multichannel screen image is received at step 350, the channel control device 100 displays the multichannel screen image on the display unit 220 in step 360.

In the case that the multichannel screen image is generated by the control unit 250 of the channel control device 100, the control unit 250 of the channel control device 100 generates the multichannel screen image with the video data corresponding to the multiple channels and displays the generated multichannel screen image on the display unit 220.

Figure 6:
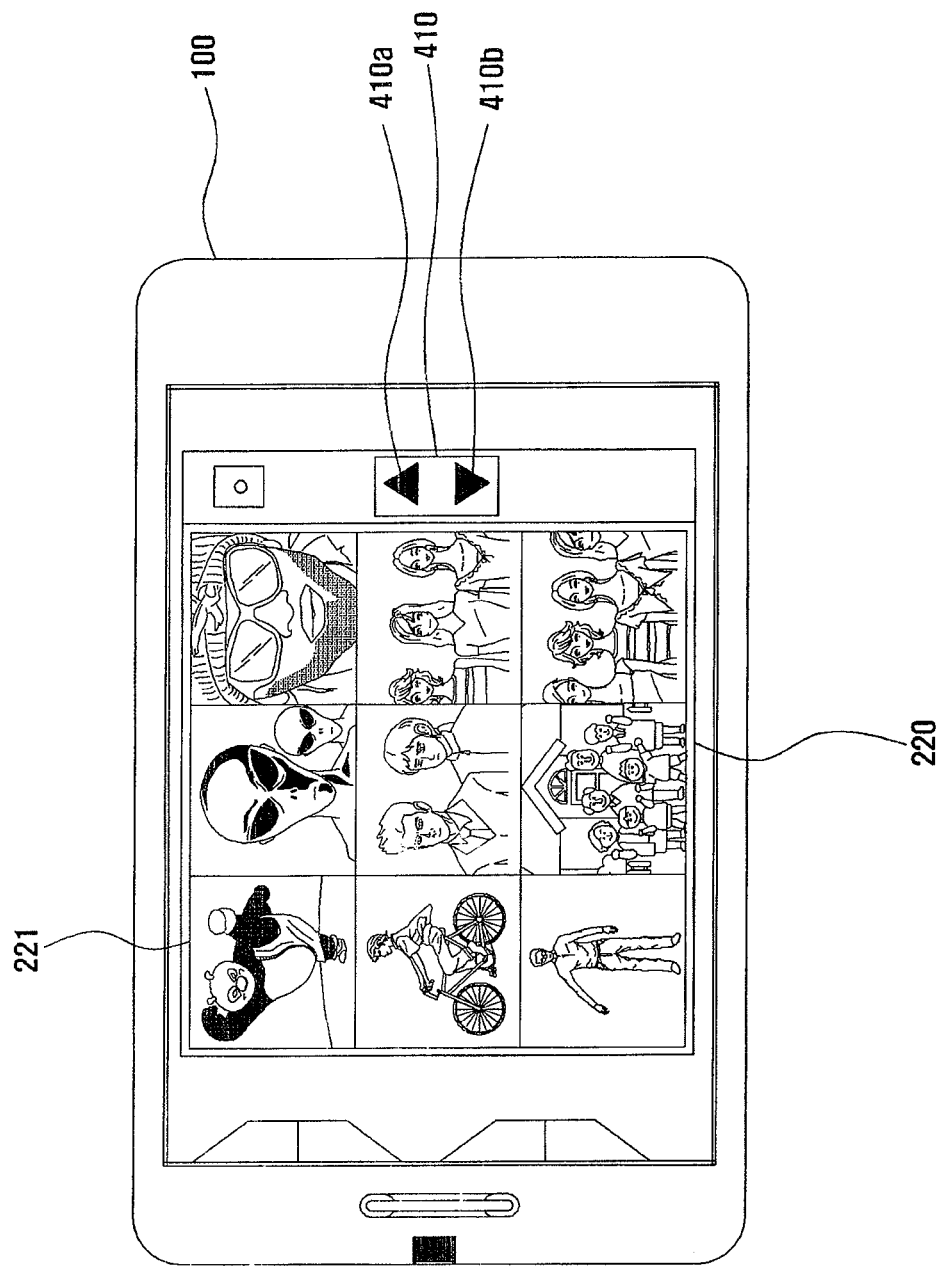
FIG. 6 is a diagram illustrating a front view of a channel control device for a broadcast reception system according to an exemplary embodiment of the present invention.

FIG. 6 is a diagram illustrating a front view of a channel control device for a broadcast reception system according to an exemplary embodiment of the present invention.

Referring to FIG. 6, screen images 221 corresponding to the video data of nine channels are displayed on the display unit 220 simultaneously in the form of a multichannel screen image. In other words, the multichannel screen image obtained by combining individual screen images of nine broadcast channels is displayed on the display unit 220 of the channel control device 100.

The individual screen images can be displayed on the display unit 220 in the form of either motion images or still images. In the case that the individual screen images are displayed in the form of still images, it is advantageous to use limited bandwidth efficiently and thereby implement the invention in devices having low processing capability. In the case that the individual screen images are displayed in the form of motion images, it is advantageous to present the broadcast data of the multiple channels in real time.

A number of channel screen images of which video data are displayed on the display unit 220 simultaneously can be changed according to the user's configuration. Although the multichannel screen image is exemplarily formed with nine channel screen images in FIG. 6, it can alternatively be formed, for example, with 16, 25, or other numbers of channel screen images. The multichannel screen image can be configured such that, when the number of channel screen images in greater than a predetermined value, the screen is scrolled by means of a scroll bar 410.

Of course, the channel control device 100 can further include a scroll bar 410.

The scroll bar 410 can, for example, be implemented with an upward scroll button 410*a* for upward scrolling and a downward scroll button 410*b* for downward scrolling. Of course, the scroll bar 410 could alternatively be implemented with a horizontal scrollbar. The screen scrolling can be implemented with any of various manipulations, such as flip manipulation and drag and drop manipulation.

In an exemplary embodiment of the present invention where the display unit 220 of the channel control device 100 displays the screen images corresponding to the video data of the channels belonging to the category selected by the user, all of the channels of which video data are displayed on the display unit 220 must belong to the selected category. For this purpose, the channel control device 100 can send a list of channels categorized into the category selected by the user to the set-top box 120. In this case, the channel control device 100 receives and displays the channel list corresponding to the category selected by the user.

Returning back to FIG. 4, the channel selector 212 of the channel control device 100 monitors to detect a channel selection command input made on one of the channel screen images displayed on the display unit 220 in step 370.

Referring to the exemplary case of FIG. 6, if the user makes a touch on the first channel screen image 221, the channel selector 212 detects that channel selection command for selecting the channel corresponding to the first channel. In case that the TV 130 is configured to display screen images of multiple channels, the channel control device 100 can be configured to receive multiple channel selection commands.

The channel selection can, for example, be entered by making a click on a specific key of a keypad.

If the channel selection command is detected, the channel selection request transmitter 234 of the channel control device 100 sends a channel selection request message to the channel configuration device 180, i.e. set-top box 120 in step 380. The channel selection request message includes the channel identifier of the selected channel. The set-top box 120 can be understood as an implementation of the channel configuration device 180.

Upon receipt of the channel selection request message, the set-top box 120 transmits the video data of the selected channel to the TV 130 (or to other types of display devices) in step 390.

The head end 110 and the set-top box 120 can optionally be implemented as an integrated single device.

The TV 130 and the set-top box 120 can optionally be implemented as an integrated single device.

The channel control device 100 can be configured to perform wireless communication with the channel configuration device 180 or with the content delivery device 190.

The channel control device 100 also can be configured to be physically connected to the channel configuration device 180 or the content delivery device 190 for communication.

As described above, the channel control method and apparatus of the present invention are capable of facilitating channel selection by providing screen images of multiple broadcast channels on the screen simultaneously.

Also, the channel control method and apparatus of the present invention are capable of navigating channels without stopping display of the video data of the ongoing broadcast channel.

Also, the channel control method and apparatus of the present invention are capable of using a channel managing device (e.g. remote controller) as a secondary television display.

While the invention has been shown and described with reference to certain exemplary embodiments thereof, it will be understood by those skilled in the art that various changes in form and details may be made therein without departing from the spirit and scope of the invention, as defined in the appended claims and their equivalents.

What is claimed is:

1. A method of managing channels for a remote control device comprising a touch screen, the method comprising:
    entering into a channel search mode automatically upon a fulfillment of a geographic condition;
    transmitting a content request message comprising a list of channels to a content delivery device, the content request message requesting video images of plural channels in the list;
    receiving video images of plural channels in the list of channels from the content delivery device;
    displaying the video images of the plural channels on the touch screen simultaneously;
    receiving an input for selecting at least one of the plural channels by a touch made on the touch screen; and
    transmitting a channel selection request indicating the selected channel to the content delivery device,
    wherein the geographic condition is fulfilled when the remote control device is located within a set distance from the content delivery device.

2. The method of claim 1, wherein the receiving of the video data comprises:
    reducing in size, at the content delivery device, the video images of the plural channels in response to a receipt of the content request message;
    generating a multichannel screen image by combining the reduced video images of the plural channels; and
    transmitting the multichannel screen image to the remote control device.

3. The method of claim 1, wherein the displaying of the video images comprises:
    downsizing the video images of the plural channels;

generating a multichannel screen image by arranging the video images; and displaying the multichannel screen image.

4. The method of claim 1, further comprising:

receiving a category selection input, wherein the displaying of the video images comprises displaying a plurality of video images of channels belonging to a category corresponding to the category selection input.

5. The method of claim 1, wherein each of the video images of plural channels comprises one of a still image or a motion image.

6. The method of claim 1, wherein the displaying of the video images comprises presenting a predetermined number of the video images simultaneously.

7. The method of claim 1, further comprising the content delivery device delivering the selected at least one of the plural channels to a display not comprising the touch screen.

8. The method of claim 7, wherein, a delivery of video content to the display continues unaffected until the transmitting of the channel selection request.

9. The method of claim 1, wherein the receiving of the input comprises a user selecting a video image corresponding to the selected channel.

10. A remote control device comprising:

a content request message transmitter configured to transmit a content request message comprising a list of channels to a content delivery device, the content request message requesting video images of multiple channels in the list;

a display unit configured to display a multichannel screen image comprising video images of multiple channels in the list of channels from the content delivery device on a touch screen;

an input unit configured to receive a channel selection input for selecting at least one of the video images corresponding to the multiple channels by a touch made on the touch screen;

a channel selection request transmitter configured to transmit a channel selection request to a channel configuration device; and a control unit configured to control the display unit to display the multiple video images on a single screen, to control the channel selection request transmitter to transmit the channel selection request corresponding to the channel selection input to the channel configuration device, to control the content request message transmitter to transmit the content request message to the content delivery device, and to enter the remote control device into a channel search mode automatically upon a fulfillment of a geographic condition, wherein the geographic condition is fulfilled when the remote control device is located within a set distance from the content delivery device.

11. The remote control device of claim 10, wherein the content delivery device reduces in size the video images of the multiple channels in response to a receipt of the content request message, generates a multichannel screen image by combining the size-reduced video images of the multiple channels, and transmits the multichannel screen image to the channel control device.

12. The remote control device of claim 10, wherein the control unit comprises:

an image downsizer configured to downsize the video images of the multiple channels; and a multichannel screen generator configured to generate the multichannel screen image by combining the video images of the multiple channels, wherein the control unit is configured to control the display unit to display the multichannel screen image.

13. The remote control device of claim 10, further comprising a category selector configured to receive a category selection input, wherein the control unit is configured to control the display unit to display the video images of the channels belonging to a category corresponding to the category selection input.

14. The remote control device of claim 10, wherein each of the video images of plural channels comprises one of a still image or a motion image.

15. The remote control device of claim 10, wherein the control unit is configured to control the display unit to display a predetermined number of the video images simultaneously.

16. The remote control device of claim 10, wherein the channel configuration device delivers a channel corresponding to the selected video image to a display not comprising the display unit.

17. The remote control device of claim 16, wherein, a delivery of video content to the display not comprising the display unit continues unaffected until the transmitting of the channel selection request.

18. The remote control device of claim 10, wherein the channel control device comprises a remote controller of a television and simultaneously functions as a secondary television.

* * * * *